US006633454B1

United States Patent
Martin et al.

(10) Patent No.: US 6,633,454 B1
(45) Date of Patent: Oct. 14, 2003

(54) SHOCK DETECTION FOR A DATA STORAGE DEVICE

(75) Inventors: Robert C. Martin, Stillwater, MN (US); William J. Vanderheyden, Loveland, CO (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/405,973

(22) Filed: Sep. 27, 1999

(51) Int. Cl.⁷ ............................................... G11B 23/02
(52) U.S. Cl. ....................................................... 360/132
(58) Field of Search ................................. 360/132, 133; 369/291; 242/341, 347, 347.1

(56) References Cited

U.S. PATENT DOCUMENTS

| | | | |
|---|---|---|---|
| 4,519,867 A | 5/1985 | Rubey | 156/351 |
| 5,323,729 A | 6/1994 | Rubey | 116/200 |
| 5,703,734 A | * 12/1997 | Berberich et al. | 360/97.02 |
| 5,755,175 A | 5/1998 | White et al. | 116/206 |
| 5,757,580 A | * 5/1998 | Andress et al. | 360/97.02 |
| 5,769,598 A | 6/1998 | MacNeil | 414/800 |
| 5,936,523 A | 8/1999 | West | 340/545.6 |
| 5,949,342 A | * 9/1999 | Frary et al. | 340/665 |
| 5,982,285 A | 11/1999 | Bueche et al. | 340/513.1 |
| 5,982,580 A | * 11/1999 | Woldemar et al. | 360/97.02 |

OTHER PUBLICATIONS

Shockwatch Products, Shockwatch Clip, worldwidweb product brochure, www.shockwatch.com/products/packaging/clip–content.html (Dec. 15, 1999).
Shockwatch Products, Shockwatch Labels, worldwideweb product brochure, www.shockwatch.com/products/packaging/labels–content.html (Dec. 15, 1999).

* cited by examiner

Primary Examiner—David Davis
(74) Attorney, Agent, or Firm—Eric D. Levinson

(57) ABSTRACT

A data storage device has a shock sense indicator disposed within its housing. The shock sense indicator may provide visible, audible, and/or machine-detectable indication of whether the data storage device has been subjected to a physical shock over some threshold. Machine detection of the shock state can be accomplished optically, mechanically, or electrically. A data storage drive has a detection switch that interfaces with a shock detector of a data storage device to ensure that no harmful operation is performed on a data storage device that has been subjected to a physical shock, thereby avoiding potential loss or corruption of data.

25 Claims, 13 Drawing Sheets

SHOCK DETECTION FOR A DATA STORAGE DEVICE

TECHNICAL FIELD

The present invention relates to removable data storage media and, more particularly, to techniques for ensuring the integrity of data stored on such media.

BACKGROUND

Removable data storage media are widely used to store vast amounts of information. Some removable media are used primarily for portability. Magnetic diskettes such as 120 MB Imation Superdisk™ media, for example, permit users to transport relatively large amounts of data between computers with convenience and security. Magnetic and optical tape are used primarily for inexpensive backup of huge volumes of data, both for desktop and data center applications. Other removable media such as optical, magneto-optic, and phase-change disks blend the benefits of portability, increased storage volume, and cost savings, and find a number of different storage applications.

As new technology yields greater data storage densities, the storage volumes offered by removable media similarly increase. With increased volumes, the value of the data stored on an individual diskette, disk, or tape cartridge ramps upward. Consequently, damage to a single storage medium becomes a greater concern. In the case of inoperability of an individual diskette, disk, or tape cartridge, large amounts of valuable data can be lost or corrupted. Data loss or corruption can result in the loss of productivity, time, and money. Therefore, data integrity is a paramount concern.

SUMMARY

The present invention is directed to a data storage device that has a shock indicator disposed within its housing. The present invention is also directed to a data storage drive capable of interfacing with a data storage device to determine whether the device has been subjected to physical shock. In addition, the present invention is directed to methods of protecting data that is saved on a data storage device by detecting whether the device has been subjected to physical shock.

The ability to detect whether a data storage device has been subjected to a shock load can be highly advantageous in ensuring data integrity. If a data storage device has been subjected to a shock load, data carried by the device can be lost or corrupted. Alternatively, the shock load can cause damage or physical shifting of components that compromises proper read/write operation. Consequently, attempts to perform read or write operations with the data storage device can result in lost or corrupted data.

With a shock indicator, a user can determine whether a data storage device has been subjected to shock, and choose to refrain from further read and write operations and submit the device to data recovery services to avoid the risk of data loss or corruption. Alternatively, a drive or library in which the data storage device is used may be equipped with a detection device that interfaces with the shock indicator to automatically ascertain whether the device has been subject to shock. The drive or library can be configured to disable further read and write operations, or notify a user of the shock condition.

The data storage device includes a data storage medium such as magnetic tape, magnetic disk, optical disk, optical tape, magneto-optic disk, phase change disk, or holographic tape, or any other type of storage media. In addition, the data storage device may have a housing that substantially encloses the data storage medium. A media access opening can be provided in the housing to permit access to the media by a drive.

Disposed within the housing of the data storage device may be a shock indicator that is capable of indicating whether the device has been subjected to a physical shock. In particular, the shock indicator can be made responsive to shock loads in excess of a predetermined threshold. In an exemplary embodiment, the data storage device is a data storage tape cartridge that incorporates an internal shock detector.

Upon receipt of a shock load of sufficient magnitude, the shock indicator may change state, e.g., visually or physically. The cartridge housing may have an aperture and the shock sense indicator may be disposed adjacent to the aperture. In some embodiments, this may facilitate visual detection of the state of the shock sense indicator by a user or by an optical detector within a drive. In this case, a window may be disposed in the aperture to facilitate visual detection of the shock sense indicator while preventing contamination of the cartridge interior. In other embodiments, the aperture may provide physical access to the indicator, e.g., by a switch within a drive that ascertains the physical state of the shock indicator.

In some embodiments, the shock sense indicator includes a detector pin. The detector pin may be disposed within the housing at a first position. However, once the device has been subjected to a physical shock over a threshold, the detector pin may be displaced from its first position to some second position. If the detector pin is not in its first position, the shock sense indicator may be said to be in a "shocked state." In at least one embodiment, the fact that the shock sense indicator is in a shocked state may be visually detectable by a user, via an aperture or translucent window disposed on the housing. Alternatively, the displacement of the detector pin may be detected by a mechanism within the drive, such as switch or optical detector.

The data storage device may also comprise a baseplate. The baseplate may be contained within the housing, or mounted to a cover to form a portion of the housing. In either case, the baseplate may physically engage the shock sense indicator that is disposed within the device. In one embodiment, the shock sense indicator includes a detector pin that is attached to the base plate in a particular position. By attaching the detector pin to the base plate in a particular position, the shock sense indicator may be tuned to a particular shock threshold such that when the device experiences a physical shock over that threshold, the shock sense indicator goes into a shocked state. For example, the base plate may have a slit adjacent to the detector pin. In particular, the slit may define a "springboard-like" member in the baseplate. The detector pin may be attached to the springboard. By setting the dimensions and mechanical properties of the springboard-like member, the shock sense indicator may be tuned so as to be responsive to a certain threshold of force.

A shock detector pin can be disposed adjacent to an aperture in the housing of the data storage device. A data storage drive may have a mechanism, such as a detector switch, that detects whether the shock sense indicator is in a shocked state. The detector switch can be arranged to mate with an aperture on the housing of the data storage device. For example, the data storage drive senses that the data storage device is in an unshocked state when the drive detector switch is able to protrude through the aperture of the data storage device. In this case, a detector pin may have a recess to facilitate mating with the drive detector switch. In a related embodiment, however, the data storage drive may sense that the data storage device is in a shocked state when the drive detector switch is able to protrude through the aperture of the data storage device.

To promote directional sensitivity and/or tune the indicator pin to desired shock thresholds, the detector pin may have an offset mass attached thereto. The presence of the offset mass may make the shock sense indicator more sensitive to physical shock along a particular axis. For instance, if an offset mass is attached perpendicularly to the detector pin, the shock sense indicator may become more sensitive to physical shock if the device is dropped on an axis parallel to the position of the detector pin.

The detector pin may be snap fit into a base plate, or alternatively the detector pin may snap fit into the housing. The detector pin may have a flange disposed on its end that engages either the baseplate or the housing. Moreover, the detector pin may be partially pressed into the baseplate or the housing. In another embodiment, the detector pin may be wedge fitted within the housing. Furthermore, in yet another embodiment, the detector pin may include a spring.

A retaining area may envelop the detector pin. In one embodiment, a physical shock over a threshold jars the detector pin loose, while the retaining area houses the loose pin so as to protect the other components of the data storage device from contact with the pin. In this embodiment, the loose pin housed in the retaining area may provide a user with an audible indication that the shock sense indicator is in a shocked state. For instance, if a user shook the device and heard the loose part rattling within the retaining area, he or she would know that the device had been subjected to physical shock.

In another embodiment, at least one visible shock sense indicator may be disposed within the housing along with one or more inspection apertures disposed adjacent to the shock sense indicator. When the device has been subjected to physical shock over a threshold, the shock sense indicator may visibly convey that information to a user. The inspection aperture may simply be a hole. However, the inspection window may alternatively be a transparent or translucent material disposed on the housing of the device or forming part of the device housing. Multiple shock sense indicators may be used, and may be oriented differently such that each is more sensitive to physical shock along a unique axis. A data storage drive may include an optical detector, such as a photodiode, that resolves whether the device has been subjected to shock based on a change in the optical state of the shock indicator, e.g., from light to dark or vice versa.

With either a visible or mechanical shock indicator, the data storage drive may be configured to either enable or disable operations based on the status of the indicator. For example, the data storage drive may be unable to perform any read/write operation on the data storage device if the shock sense indicator is in a shocked state. Alternatively, the data storage drive may activate a read only mode upon sensing that the shock sense indicator is in a shocked state.

Moreover, the data storage drive may store shock sense data on the data storage device if the shock sense indicator is in a shocked state. The shock sense data may include the date and time that the data storage drive first stored sense data on the data storage device. The data storage drive may sense the shock sense data and operate in accordance with the status of that data. For instance, if the shock sense data indicates that the data storage device has been subjected to shock, the data storage drive may operate in a read only mode. This capability may allow technicians to diagnose the cause of a potential failure condition of the device.

In one embodiment, the present invention provides a data storage device comprising a data storage medium, a housing that substantially encloses at least a portion of the data storage medium, and a shock sense indicator disposed within the housing.

In another embodiment, the present invention provides a data storage drive for manipulating data stored on a data storage device, the data storage drive comprising a mechanism that interfaces with the data storage device to determine whether the data storage device has been subjected to physical shock over a threshold.

In a further embodiment, the present invention provides a data storage device comprising a data storage medium for storing data, a housing that substantially encapsulates the data storage medium, and a detector pin within the housing disposed at a first position, wherein a physical shock over a threshold causes the detector pin to move from its first position.

In an added embodiment, the present invention provides a data storage device comprising a data storage medium for storing data, a housing that substantially encapsulates the data storage medium, at least one visible shock sense indicator disposed within the housing, and an inspection aperture formed on the housing adjacent to the at least one visible shock sense indicator.

In another embodiment, the present invention provides a method for protecting data stored on a data storage device comprising providing a shock sense indicator inside a data storage device, checking whether the shock sense indicator has been subjected to physical shock over a threshold, and disabling the ability to operate at least one operation on the data storage device if the shock sense indicator has been subjected to physical shock over a threshold.

In a further embodiment, the present invention provides a method for protecting data stored on a data storage device comprising providing a shock sense indicator inside a data storage device, checking whether the shock sense indicator has been subjected to physical shock over a threshold, saving the data stored on the data storage device to another data storage medium, and retiring the data storage device in the event the shock sense indicator has been subjected to physical shock over a threshold.

In an added embodiment, the present invention provides a method of protecting data stored on a data storage device comprising providing a shock sense indicator inside a data storage device, determining whether the shock sense indicator has been subjected to a physical shock over a threshold, and preserving the data stored on the data storage device if the shock sense indicator has been subjected to a physical shock over a threshold.

In another embodiment, the present invention provides a data storage system comprising a data storage device that includes a data storage medium, a housing that substantially encloses at least a portion of the data storage medium, a shock sense indicator disposed within the housing, and a data storage drive for manipulating data stored on a data storage device, the data storage drive comprising a mechanism that interfaces with the data storage device to determine whether the data storage device has been subjected to physical shock over a threshold. Other advantages, features, and embodiments of the present invention will become apparent from the following detailed description and claims.

DETAILED DESCRIPTION OF THE DRAWINGS

Figure 1:
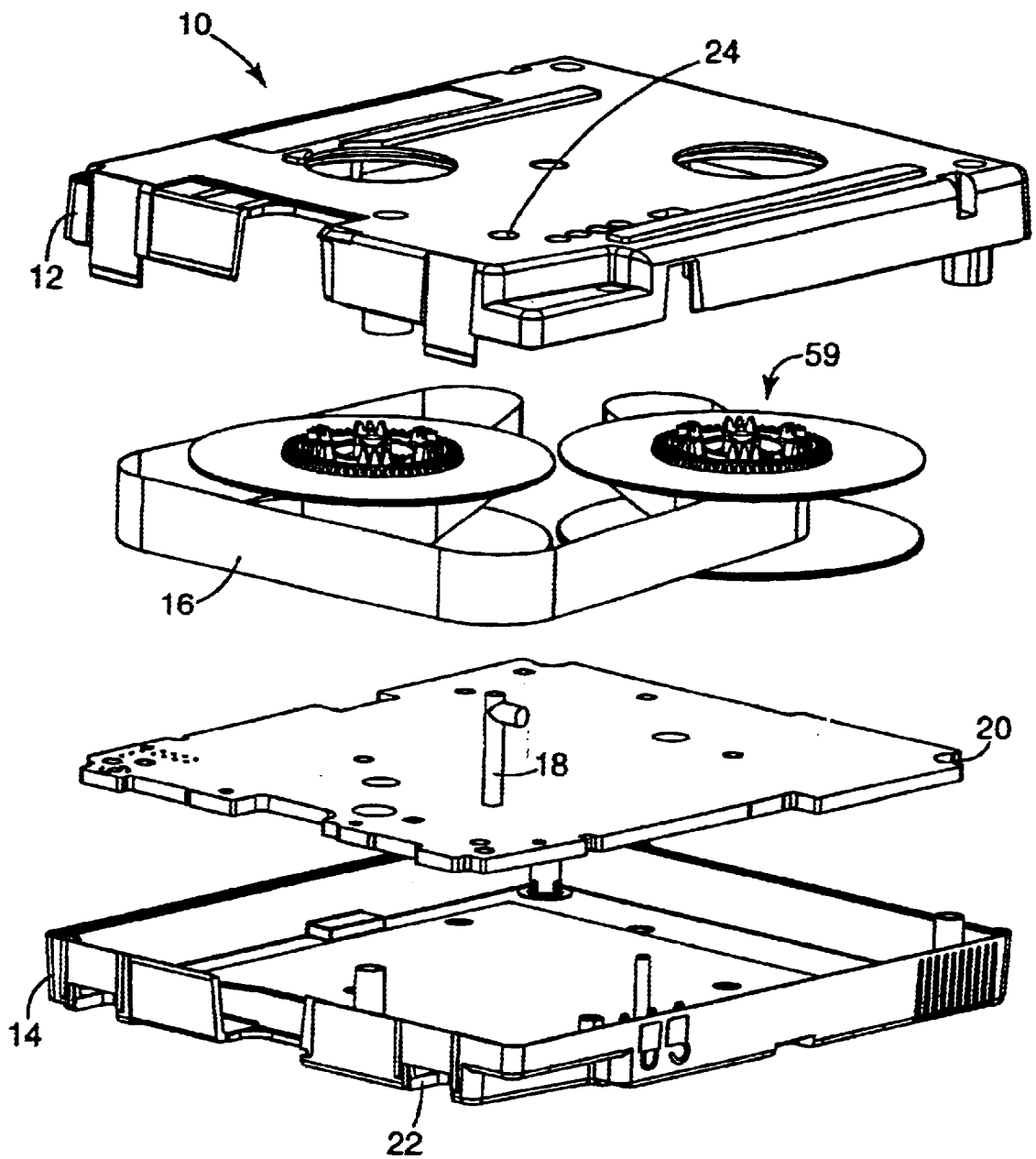
FIG. 1 is an exploded view of a data storage device in accordance with the present invention.

FIG. 1 is an exploded view of a removable data storage device 10 in accordance with an embodiment of the present invention. Data storage device 10 includes a housing having a top housing portion 12 and a bottom housing portion 14. Housing portions 12, 14 may substantially enclose a data storage medium 16. A shock sense indicator 18 may be disposed within the housing. Housing portions 12 and 14 may be of a substantially rigid material, and can be made of injection molded plastic such as polycarbonate, polystyrene, acetyl butadiene styrene (ABS), or polyethylene. Data storage device 10 may further comprise a baseplate 20, which can be formed from a rigid material such as aluminum or steel.

Baseplate 20 may form a portion of the housing, or alternatively may be completely enclosed by the housing. In particular, bottom housing portion 14 may form the bottom housing portion of the housing of data storage device 10. Alternatively, the bottom housing portion may define a void 22 such that baseplate 20 provides the bottom side of the housing. Baseplate 20 may define a reference surface for a locating mechanism within a drive, providing precise positioning of device 10 relative to read and write hardware. Shock sense indicator 18 may be attached to baseplate 20 and/or housing portion 12 or 14.

Data storage device 10 may further define an aperture 24 formed in at least one of housing portion 12 or 14. Shock sense indicator 18 may be disposed adjacent to and in alignment with aperture 24. A user may be able to visibly detect the state of shock sense indicator 18 through aperture 24. Also, aperture 24 may allow a mechanism within a data storage drive to interface with shock sense indicator 18. A switch or optical sensor, for example, can be oriented within the drive to detect the state of shock sense indicator 18. A switch may physically detect a position of shock sense indicator 18, e.g., by extending into aperture 24. An optical sensor may detect the position of shock sense indicator 18 by detecting an optical characteristic of aperture 24.

Data storage device 10, as shown in FIG. 1, may take the form of a data cartridge containing magnetic tape as the data storage medium 16. The tape can be wound about a pair of hubs to form a tape pack 59. However, other types of removable data storage devices may take advantage of the features of the present invention. Device 10 can be realized, for example, by a removable diskette or disk providing magnetic, optical, magneto-optic, phase change, holographic, or other types of media. A shock sense indicator 18 may be useful with any type of data storage device in which data integrity can be affected by physical disturbances, e.g., in terms of damage to the recording medium or shifting of components away from tolerances required for read or write operations.

Figure 2:
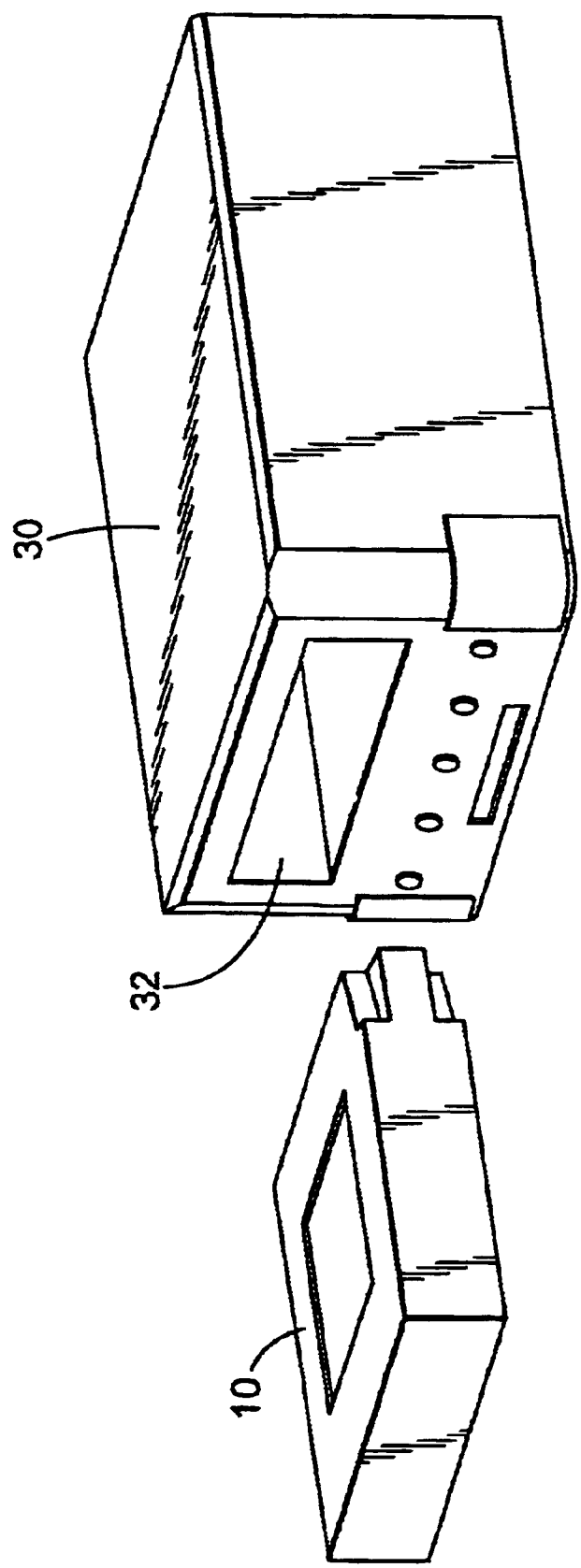
FIG. 2 shows a data storage drive for interaction with a data storage device as shown in FIG. 1.

FIG. 2 shows one embodiment of a data storage drive 30 that could be configured to interface with a data storage device 10 as shown in FIG. 1. As shown in FIG. 2 a data storage drive 30 may accept or otherwise interact with a data storage device 10. Data storage drive 30 is shown in FIG. 2 as an external drive. However drive 30 could take the form of an internal drive. Drive 30 defines an access door 32 for receipt of at least a portion of device 10. In some embodiments, device 10 may be loaded into drive 30 and drawn completely inside. Alternatively, drive 30 may receive only a leading portion of device 10.

Figure 3:
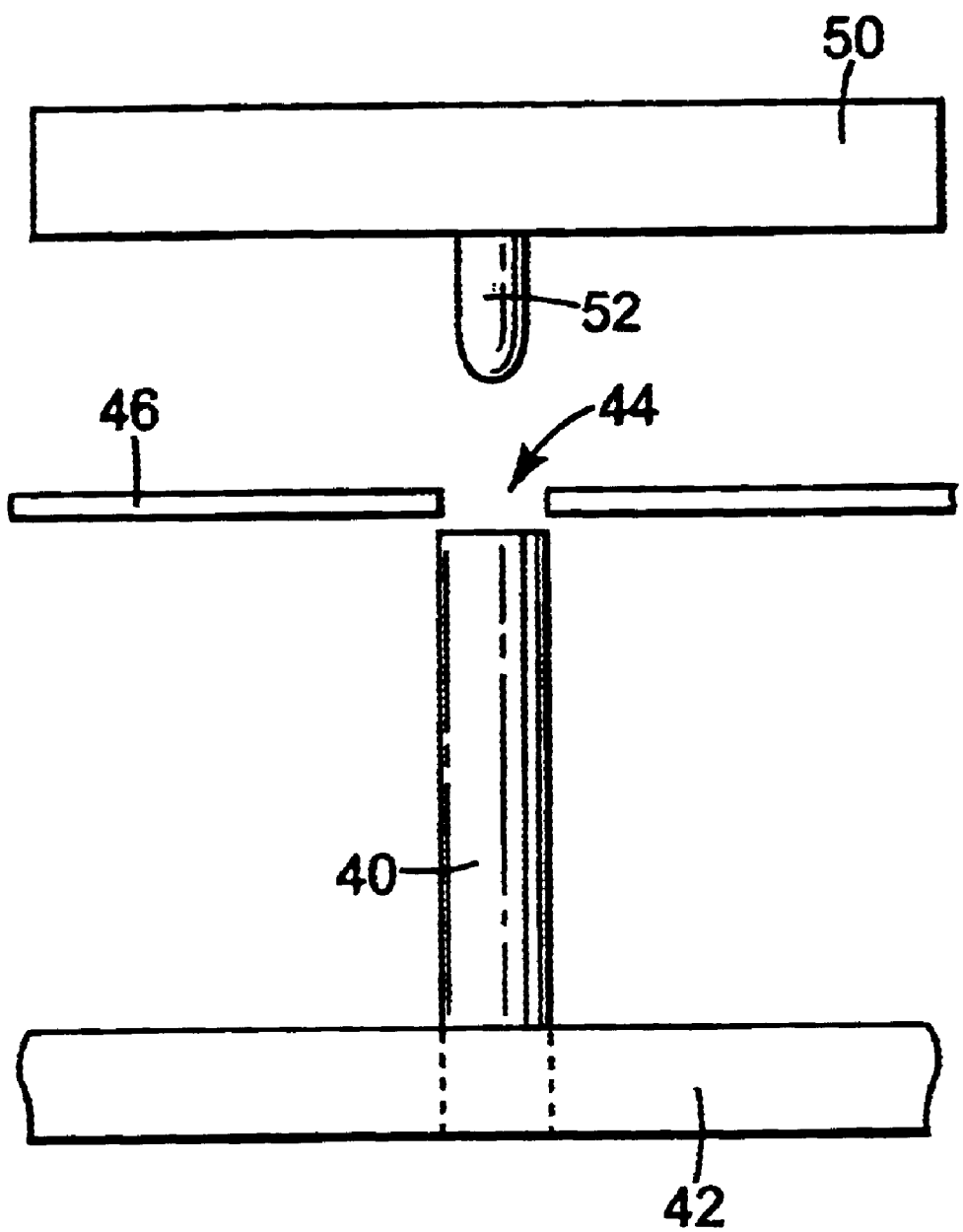
FIG. 3 shows one embodiment of a shock sense indicator of a data storage device arranged to interface with a detector switch of a data storage drive.

FIG. 3 shows one embodiment of a shock sense indicator 40 of a data storage device 10 that interfaces with a detector switch of a data storage drive. As shown, a shock sense indicator 40 may take the form of a detector pin. Shock sense indicator 40 may be attached to a base plate 42 associated with data storage device 10, or alternatively may be attached to some other rigid component of the device. Shock sense indicator 40 may be attached by a variety of techniques as shown in FIGS. 6–14. In addition, the shock sense indicator 40 may be bonded to a rigid component via an adhesive bond. Shock sense indicator 40 may be disposed adjacent to an aperture 44 defined by device housing 46.

A drive detector switch 50 mounted within the data storage drive may interface with data storage device 10. Drive detector switch 50 may be housed in a data storage drive 30 as shown in FIG. 2. By interfacing with data storage device 10, detector switch 50 may be able to detect whether the shock sense indicator 40 has been subjected to physical shock over some threshold. Switch 50 may take the from of a spring-loaded switch having an actuator or "plunger" 52 that is normally biased outward. Upon engagement with the pin of shock sense indicator 40, plunger 52 is depressed against the spring bias, closing or opening internal contacts to indicate the state of switch 50, and thus the state of the shock sense indicator.

The shock sense indicator 40 may be initially disposed in a first position as shown in FIG. 3. If data storage device 10 is subjected to a physical shock of a sufficient magnitude, however, shock sense indicator 40 may displace from its first position. If shock sense indicator 40 has displaced from its first position, it is said to be in a "shocked state." Displacement of indicator 40 generally refers to any movement from an initial position such as by tilting relative to a longitudinal axis of the indicator, or longitudinal movement.

When a drive detector switch 50 interfaces with data storage device 10, drive detector switch 50 is able to detect whether the shock sense indicator 40 has displaced from its first position. In particular, if plunger 52 engages indicator 40 within aperture 44, device 10 is not in a shocked state. If plunger 52 is unable to engage indicator 40, however, it is determined that the indicator pin has tilted, indicating a shocked state. The functionality of the data storage drive 30 may be affected if the drive detector switch 50 detects that the shock sense indicator 40 is in a "shocked state."

In normal situations, data storage drive 30 may interact with a data storage device to read, write, or otherwise manipulate the data stored on a data storage device 10. When data storage drive 30 detects that shock sense indicator 40 has been displaced from its first position, however, a control mechanism within the drive may disable or alter particular drive functions. For example, when a shocked state is detected, the drive may disable read and write operations altogether. Alternatively, write operations may be disabled such that drive 30 and device 10 operate in a read-only mode. Further, the user may be alerted to the shocked status of device 10, and given the option to proceed with read and write operations. In some embodiments, operation of data storage drive 30 may be enabled only if shock sense indicator 50 is not in a shocked state.

In some embodiments, data storage drive 30 may store sense data on data storage device 10 when drive detector switch 50 determines that a shock sense indicator 40 is in a shocked state. In this case, data storage drive 30 may be able to operate on data storage device 10 in a fully read/write enabled mode or a read only mode upon detecting that sense data has been stored on data storage device 10. The sense data may include the date and time that data storage drive 30 stored the sense data on data storage device 10. Thus, the sense data provides a ready indication of a potential data integrity risk, while documenting the date and time of the first shock detection for analysis by data recovery technicians.

Figure 4:
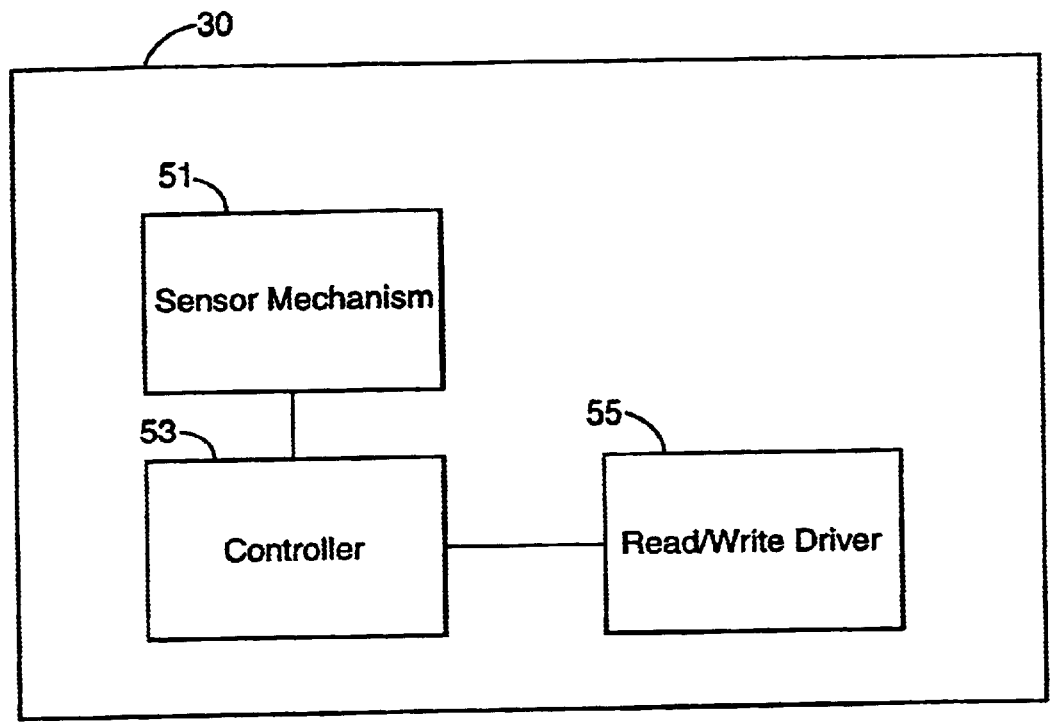
FIG. 4 is a functional block diagram showing an embodiment of a data storage drive in accordance with the present invention.

FIG. 4 is a functional block diagram illustrating a data storage drive in accordance with an embodiment of the present invention. As shown, data storage drive 30 includes a sensor mechanism 51, which may incorporate a drive detector switch 50 as described with reference to FIG. 3. Sensor mechanism 51 may be coupled to a controller 53 which may take the form of a microprocessor, microcontroller, ASIC, or discrete circuitry programmed or otherwise configured to process shock sense status indicated by switch 50, and control drive 30 in response to such status.

Controller 53 may be configured, for example, to control a read/write driver 55, which drives the read and write functions of drive 30. Thus, controller 53 receives shock status information from sensor mechanism 51, controls read/write driver 55 based on such information. For example, if controller 53 receives information from the sensor mechanism 51 which indicates that a data storage device 10 is in a shocked state, then controller 53 may place read/write driver 55 into a read only mode. Alternatively, controller 53 may be arranged to communicate a message to a host computer associated with drive 30, advising the user of a data integrity risk.

Figure 5:
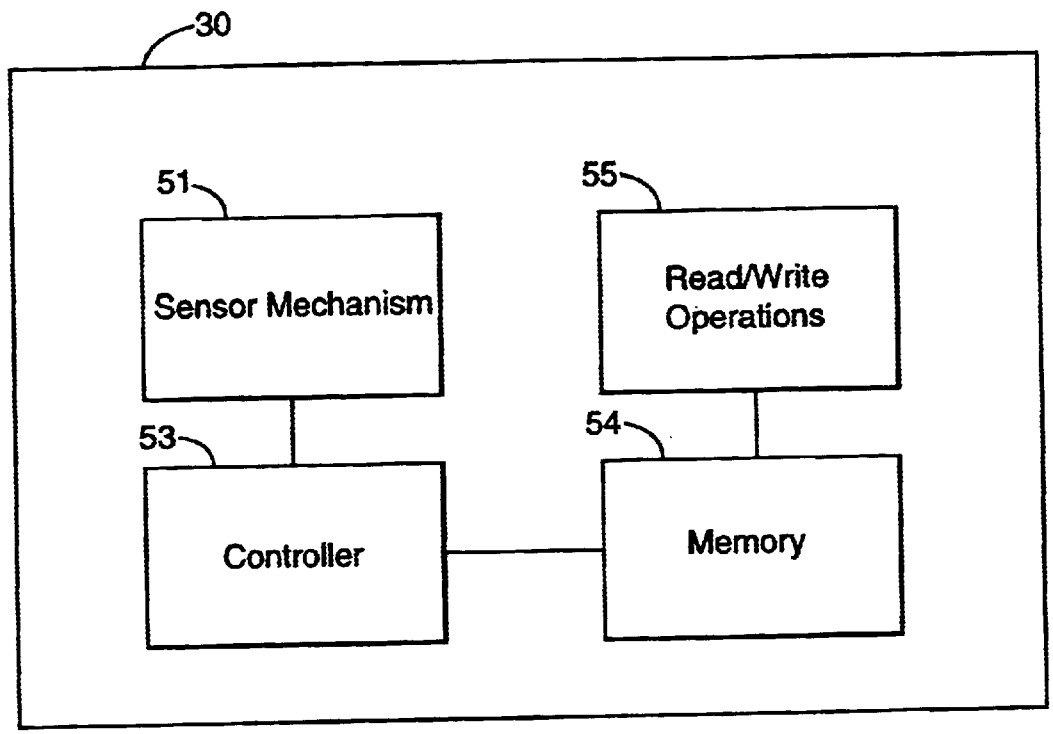
FIG. 5 is a functional block diagram showing a further embodiment of a data storage drive in accordance with the present invention.

FIG. 5 is a block diagram illustrating a data storage drive 30 in accordance with another embodiment of the present invention. As shown in FIG. 5, controller 53 may be configured to store information into a memory 54 that indicates whether a data storage device 10 is in a shocked state. A read/write driver 55 may operate in a manner that is at least partially determined by the information stored in memory 54. In particular, read/write driver 55 may be configured to access memory 54 to ascertain the shock status of device 10. The shock status can be recorded in memory 54 along with a serial number of global unique identifier associated with the particular data storage device 10. In this manner, read/write driver 55 can determine the status of device 10 each time it is loaded in the drive by reference to memory 54.

If controller 53 receives information from sensor mechanism 51 that indicates that data storage device 10 is in a shocked state, the controller stores that information in memory 54. Read/write driver 55 then may access the information stored in the memory 54 and operate accordingly. For instance, if the information stored in memory 54 indicates that a data storage device 10 is in a shocked state, then the read/write operator 55 may operate in a read only mode. Alternatively, read/write driver 55 can be configured to disable read and write operations altogether for the respective device 10. Read/write driver 55 can be integrated with controller 53, or realized by a discrete controller or circuitry.

Figure 6:
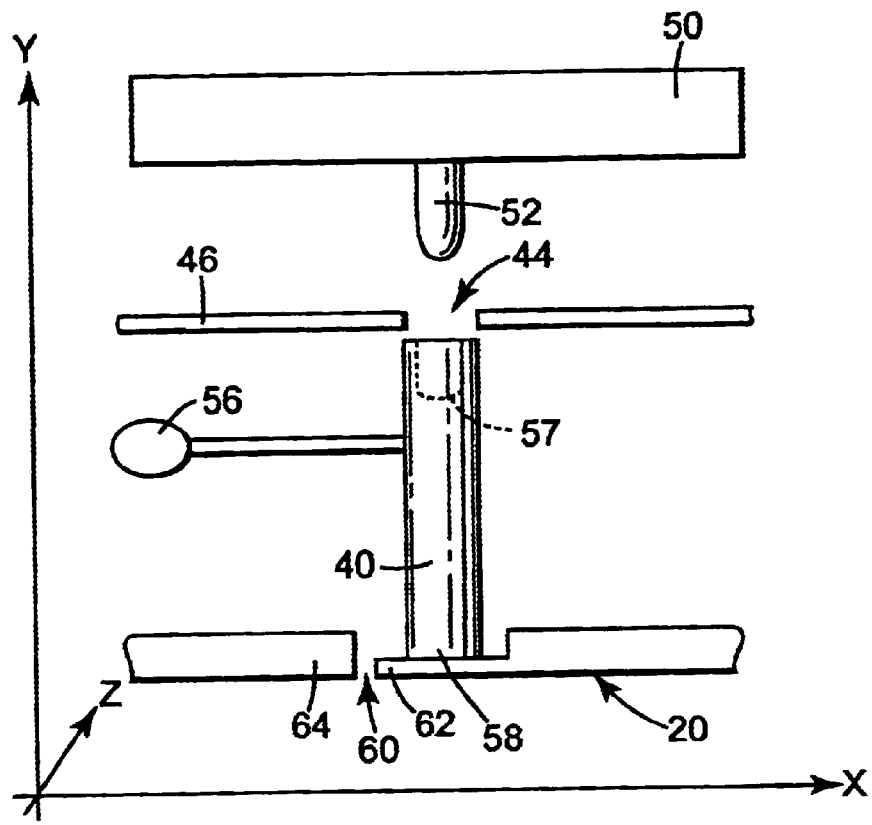
FIG. 6 shows another shock sense indicator arranged to interface with a detector switch of a data storage drive.

FIG. 6 shows another shock sense indicator arranged to interface with a detector switch of a data storage drive. When data storage device 10 is inserted into data storage drive 30, drive detector switch 50 moves into aperture 44. Shock sense indicator 40 may have a recess 57 as shown in FIG. 6, such that drive detector switch 50 is able to protrude through the aperture 44 and into the recess of shock sense indicator 40 when the shock sense indicator is in an unshocked state. In this manner, the drive detector switch 50 is able to determine whether shock sense indicator 40 has been subjected to a physical shock over some threshold.

The threshold is the amount of force required to displace the shock sense indicator 40 to a position such that drive detector switch 50 is unable to protrude into the aperture. In other words, drive detector switch 50 indicates a no shock state when it is able to protrude into recess 57, and indicates a shock state when is not. In response to physical shock, indicator 40 may tilt relative to aperture 44 such that recess 57 is no longer aligned with plunger 52. In that case, plunger 52 is unable to protrude into recess 57. Instead, plunger 52 engages a portion of the misaligned pin associated within indicator 40, and thereby is depressed against the internal spring bias of switch 50. In the embodiment of FIG. 6, depression of plunger 52 indicates a shock state of device 10.

In other embodiments, indicator 40 does not include a recess 57 as shown in FIG. 6. Instead, plunger 52 of drive detector switch 50 is unable to protrude through aperture 44 when shock sense indicator 40 is in a first position aligned with aperture 44. However, if the shock sense indicator 40 has displaced from its first position, plunger 52 of drive detector switch 50 may be able to protrude through aperture 44. In this manner, when shock sense indicator 40 has not been subjected to physical shock over a particular threshold, the pin remains aligned with aperture 44 such that plunger 52 is depressed upon insertion into the aperture.

When an amount of force sufficient to displace shock sense indicator 40 is applied, the indicator pin is not in alignment with aperture 44. As a result, plunger 52 of drive detector switch 50 is able to protrude through aperture 44 without being depressed. When switch 50 is able to protrude through aperture 44, device 10 is in a shocked state. Also, a user can visually inspect aperture 44 to ascertain the orientation of indicator 40. Thus, both visual and machine-detectable shock indication are provided.

As further shown in FIG. 6, shock sense indicator 40, which provides a detector pin in the illustrated embodiment, may have an offset mass 56 attached thereto. The offset mass 56 may provide additional sensitivity to shock sense indicator 40, as well as directional sensitivity to shock forces applied along particular axes. In the example of FIG. 6, when shock sense indicator 40 is subjected to a force along either the X or Z axis, a moment of force occurs on the shock sense indicator on its attached end 58. By attaching an offset mass 56 to shock sense indicator 40, a similar but more pronounced moment of force may occur on shock sense indicator 40 at its attached end 58 when the shock sense indicator is subjected to a force along the Y axis. In this manner, offset mass 56 makes the shock sense indicator more sensitive to physical shock along the Y axis. Indeed, in a data tape cartridge 10 having a shock sense indicator 40, the most sensitive drop axis in terms of potential data loss or corruption may be along the center of the spool of the magnetic tape pack. As this may correspond to the Y axis in FIG. 6, the presence of an offset mass 56 may provide the shock sense indicator 40 with added sensitivity in a directional manner along the most sensitive drop axis of the tape cartridge.

Also shown in FIG. 6 is a slit 60 and a thinned portion 62 of baseplate 20, adjacent a thicker portion 64 of the baseplate. The thicker portion 64 may define the normal baseplate thickness. By attaching shock sense indicator 40 to the thinned portion 62 of baseplate 20, the shock sense indicator may be more sensitive to physical shock or more precisely tuned to be responsive to a physical shock over a particular threshold. In particular, thinned portion 62 offers less rigidity to the pin of indicator 40, permitting the pin to more readily displace from its normal position in response to a shock load. In effect, thinned portion 62 acts as a springboard relative to more rigid areas of baseplate 20.

Figure 7:
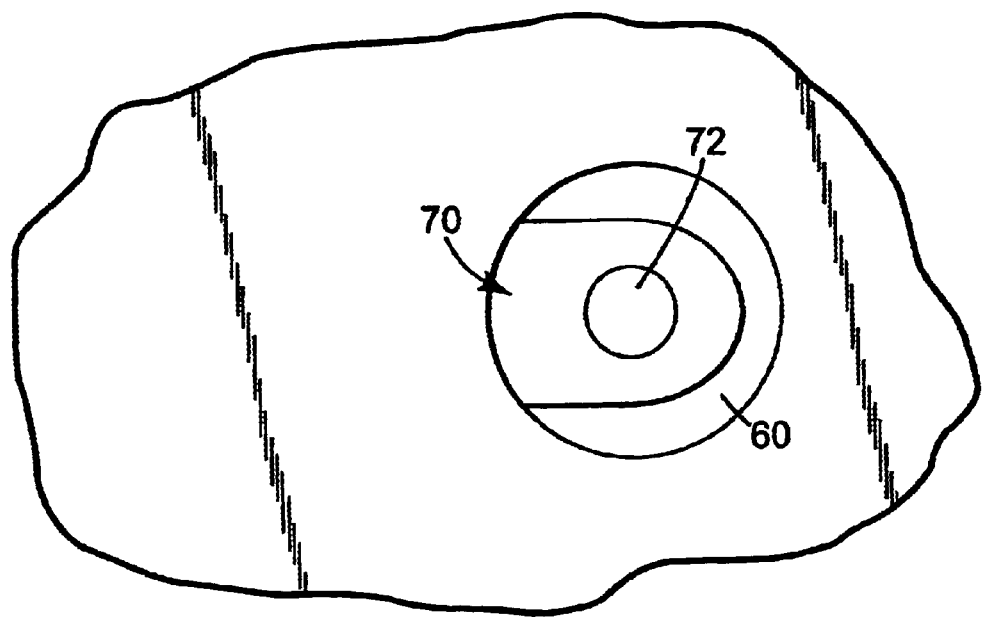
FIG. 7 is a sectional view of a baseplate having a slit that defines a "springboard" member for mounting of a shock indicator pin.

FIG. 7 is a sectional plan view of baseplate 20 having slit 60, which defines a springboard area 70. Springboard 70 may be formed by thinned portion 62 of baseplate 20 as shown in FIG. 6. The shock sense indicator 40 (not shown in FIG. 7) is attached to springboard 70 at the mounting aperture indicated by reference numeral 72. Thus, springboard 70 provides the mounting surface for indicator 40. The indicator pin can be press-fitted into mounted aperture 72. By attaching shock sense indicator 40 to springboard 70, the shock sense indicator may be more sensitive to physical shock or more precisely tuned to be responsive to a particular physical shock threshold.

Figure 8:
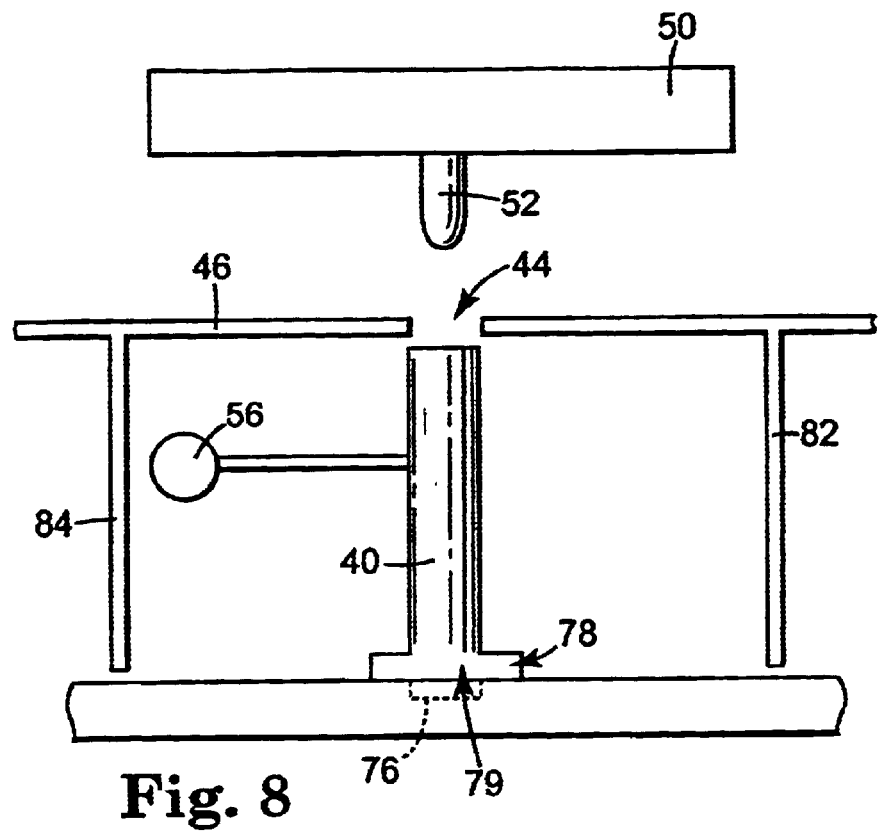
FIG. 8 shows another embodiment of a shock sense indicator arranged to interface with a detector switch of a data storage drive.

FIG. 8 shows a shock sense indicator 40 of a data storage device 10 in accordance with another embodiment of the present invention. The embodiment of FIG. 8 is configured to interface with a detector switch 50 of a data storage drive 10. As shown in FIG. 8, shock sense indicator 40 may be press fitted into a mounting aperture in the housing or baseplate 20 as indicated by reference numeral 76. As such, the shock sense indicator 40 may become physically detached when exposed to a physical shock over some threshold, where the threshold is the amount of force required to jar the shock sense indicator 40 loose.

Shock sense indicator 40 may have a flange 78 disposed on its attached end 79. Flange 78 may help facilitate the physical detachment of the shock sense indicator 40 when the shock sense indicator 40 is subjected to a physical shock over some threshold. In particular, flange 78 may bear against baseplate 20 in response to shock loads, and thereby promote loosening of the press fit in aperture 76. Further, as in the embodiment shown in FIG. 6, a mass 56 can be attached to the pin of indicator 40 to provide added directional sensitivity to shock loads along desired axes.

As shown in FIG. 8, shock sense indicator 40 may be enclosed by one or more retaining walls 82, 84. Retaining walls 82, 84 can be realized by a single continuous wall, or a series of wall segments that extend around indicator 40. Retaining walls 82, 84 may substantially enclose shock sense indicator 40 so that if the detector pin is jarred loose, it is isolated from the other components of device. In this manner, a user may also audibly detect when shock sense indicator 40 is in a shocked state, e.g. by shaking the device and hearing the shock sense indicator rattling inside the retaining walls 82, 84. At the same time, plunger 52 of switch 50 can be oriented to detect the presence of indicator 40 within aperture 44. Thus, audible, visual, and machine-detectable shock indications are provided.

Figure 9:
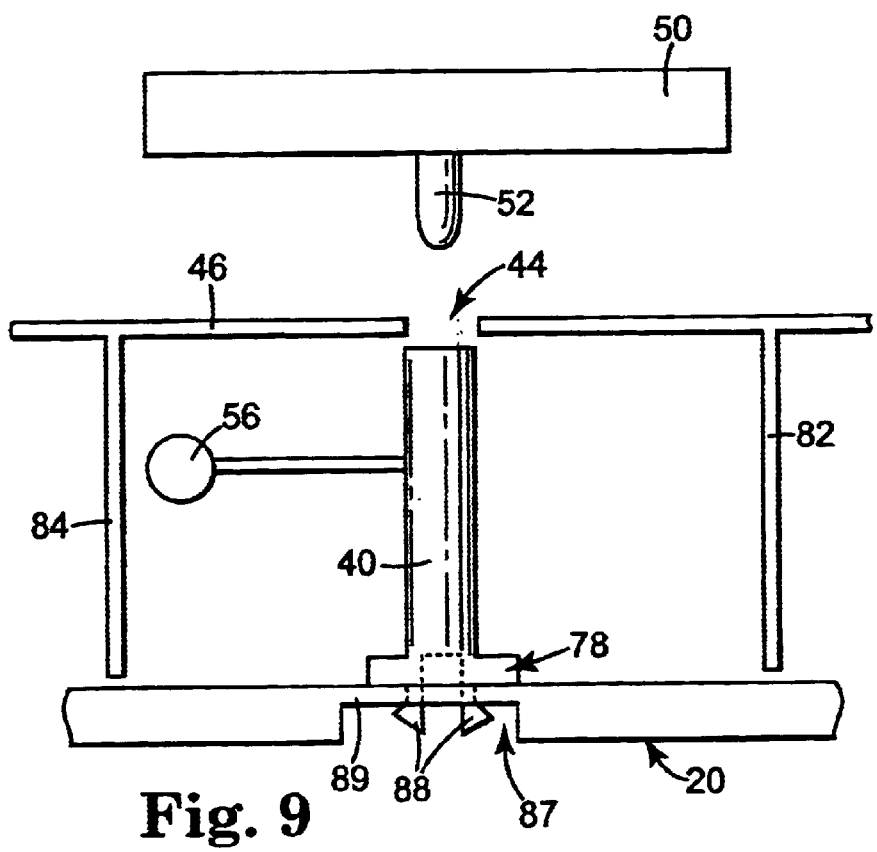
FIG. 9 shows an added embodiment of a shock sense indicator arranged to interface with a detector switch of a data storage drive.

FIG. 9 shows another embodiment of a shock sense indicator 40 of a data storage device 10 that interfaces with a detector switch 50 of a data storage drive 30. As shown in FIG. 9, shock sense indicator 40, which incorporates a detector pin may be snap fit into either baseplate 20 or another portion of the housing. Snap posts 88 can be provided to help hold shock sense indicator 40 in its first position. In particular, snap posts 88 extend through an aperture 87 in a thinned portion 89 of base plate 20, and exert a spring bias against the inner walls of the aperture to resist displacement of indicator 40. Again, a mass 56 can be provided for added sensitivity. Mass 56 may promote displacement of indicator 40, whereas snap posts 88 may resist it. Together, mass 56 and snap posts 88 set the shock threshold necessary for displacement of indicator 40. Walls 82, 84 can be incorporated to retain indicator 40 upon displacement, providing audible, visual, and machine-detectable shock indication.

Figure 10:
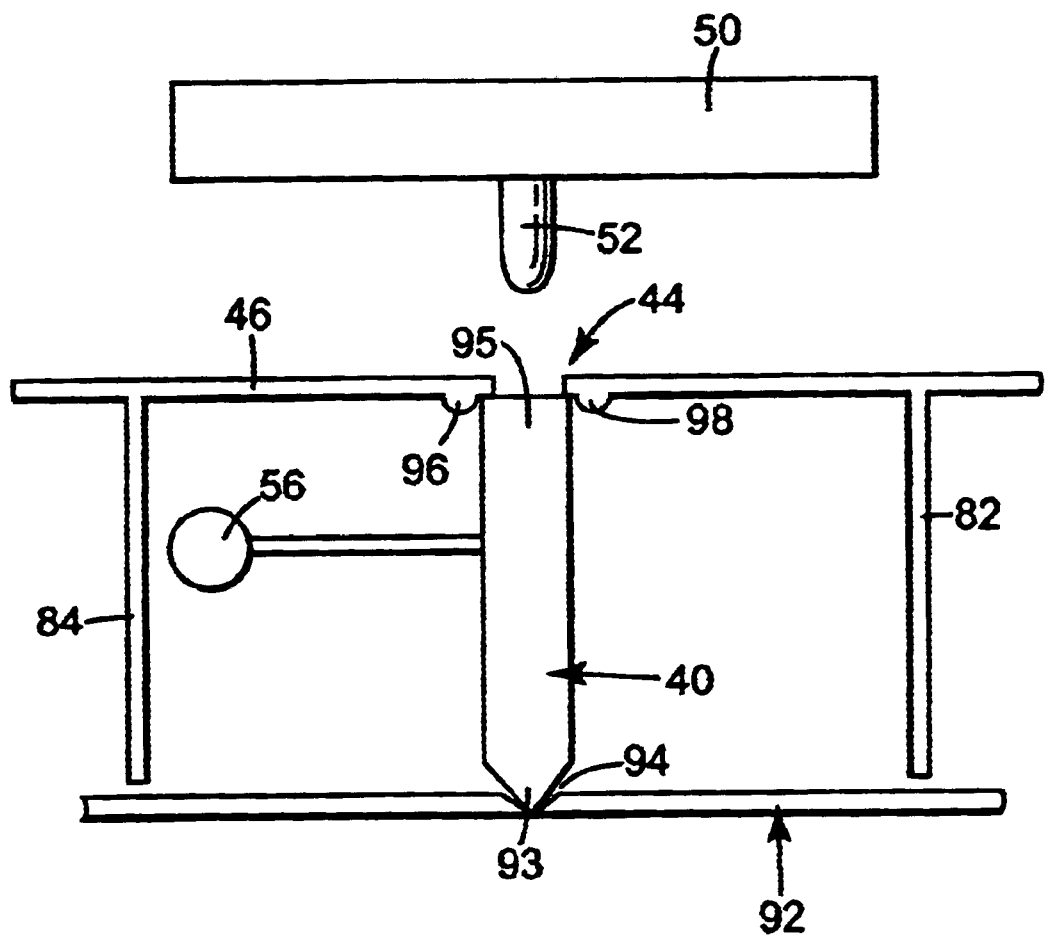
FIG. 10 shows a further embodiment of a shock sense indicator arranged to interface with a detector switch of a data storage drive.

FIG. 10 shows another embodiment of a shock sense indicator 40 of a data storage device 10 that interfaces with a detector switch 50 of a data storage drive 30. In FIG. 10, shock sense indicator 40 may take the form of a pin that is wedge fitted inside a retaining area. A retaining area may be defined by a top portion 46 of the device housing, a bottom portion 92 of the housing and retaining walls 82, 84. One end 93 of shock sense indicator 40 may be wedge-fitted into a groove 94 of bottom potion 92 of the housing. Another end 95 of shock sense indicator 40 may fit between two or more nubs 96, 98 on top portion 46 of the housing. Alternatively, nubs 96, 98 may take the form of a continuous ring that protrudes from top portion 46. In this manner, shock sense indicator 40 may be wedged between top and bottom portions 46, 92 such that it is jarred loose only by a physical shock over a threshold determined by the mounting forces at ends 93, 95 and, optionally, mass 56. Again, audible, visual, and machine-detectable shock indication are provided.

Figure 11:
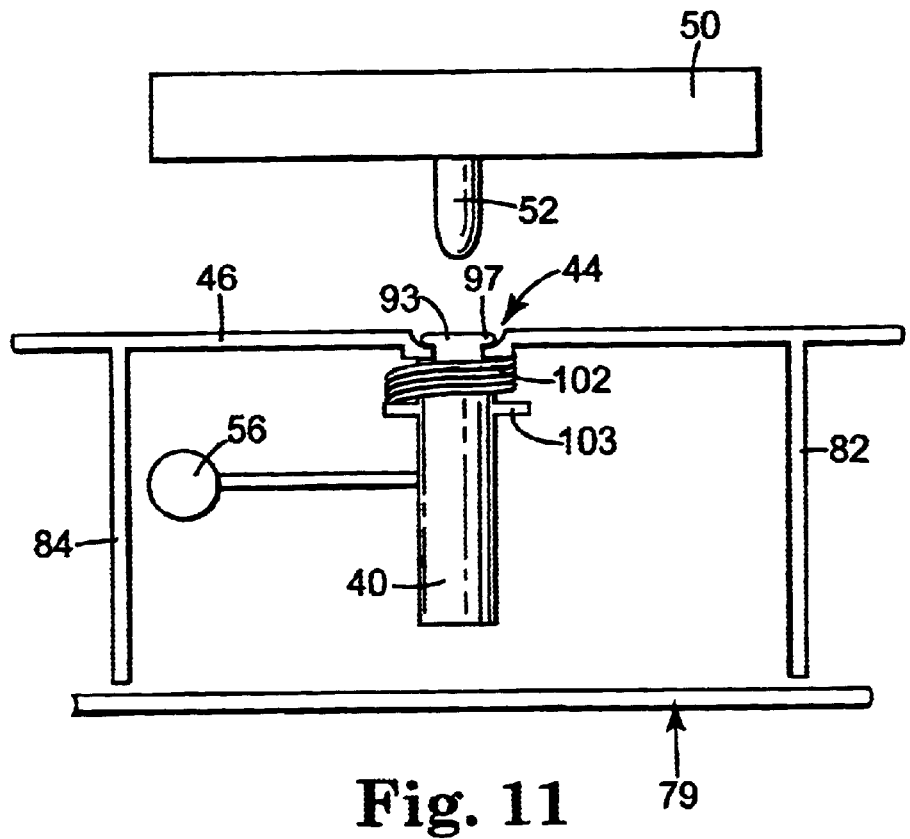
FIG. 11 shows another embodiment of a shock sense indicator arranged to interface with a detector switch of a data storage drive.

FIG. 11 shows another embodiment of a shock detector 40 of a data storage device 10 that interfaces with a detector switch 50 of a data storage drive 30. In FIG. 11, shock sense indicator 40 may take the form of a pin that is mounted to an upper portion 46 of the housing via a spring 102. In particular, one end 93 of shock sense indicator 40 may be snap fitted into the top housing portion 46 at aperture 44 and define a rim 97. Spring 102 is mounted about indicator 40 in a compressed state proximate aperture 44. Spring 102 bears against upper portion 46 of the housing and posts or a ring 103 formed on indicator 40. In this manner, spring 102 serves to bias indicator 40 away from aperture 44 to promote disengagement of the snap fit upon application of a shock load. In other words, spring 102 helps ensure that shock sense indicator 40 is jarred completely loose from aperture 44 when the device experiences a physical shock over a threshold. In this manner, spring 102 may help define the shock threshold for displacement of shock sense indicator 40, in addition to mass 56, if desired. Again, audible, visual, and machine-detectable shock indication are provided.

Figure 12:
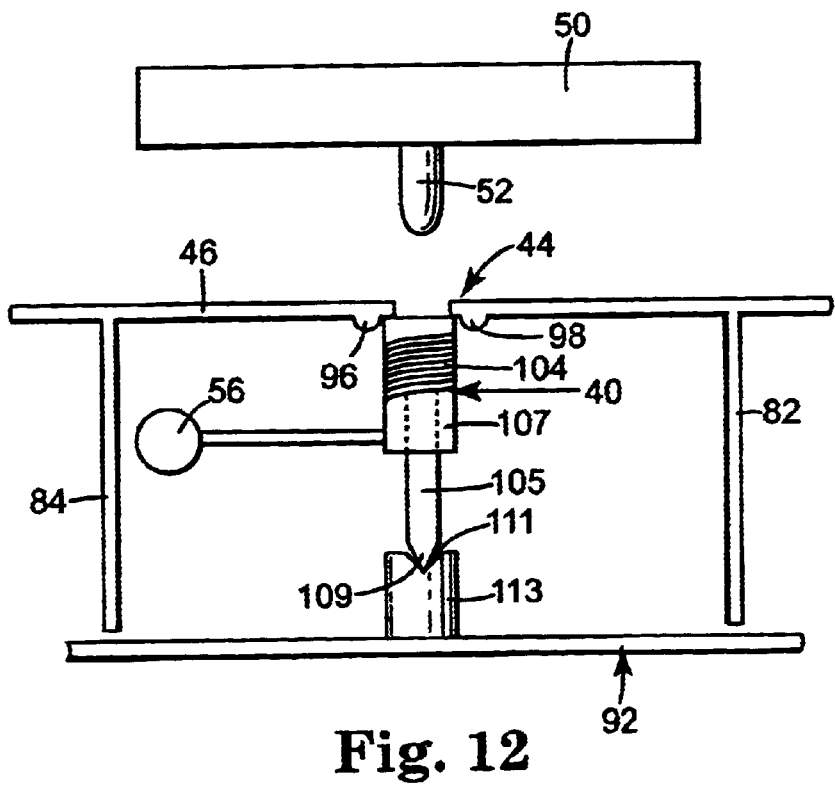
FIG. 12 shows an added embodiment of a shock sense indicator arranged to interface with a detector switch of a data storage drive.

FIG. 12 shows still another embodiment of a shock sense indicator 40 of a data storage device 10 that interfaces with a detector switch 50 of a data storage drive 30. In FIG. 12, shock sense indicator 40 may take the form of a spring-loaded detector pin wedged between housing walls 46 and 92 and incorporate an offset mass 56. Indicator 40 may incorporate a three-piece construction having an inner pin 105, a spring 104 mounted about pin 105, and a cylindrical sleeve 107 mounted about the spring and pin. In operation, spring 104 is compressed and bears against sleeve 107 and pin 105, tending to bias them away from one another. In particular, spring 104 biases sleeve 107 toward aperture 44 and into engagement within retaining nubs or ring 96, 98. Also, spring 104 biases one end 109 of pin 105 into a wedge mount 111 defined in a mounting platform 113 in lower portion 92 of the housing. Mounting platform 113 and nubs or ring 96, 98 can be integrally formed with the housing, e.g., by molding.

Spring 104 may define the sensitivity of shock sense indicator 40. By using a spring 104 that is substantially rigid, e.g. having a high spring constant, detector pin 40 may be tightly wedged in between the housing walls 46 and 92 such that only a significant shock can displace the indicator. However, if a less rigid spring 104 is used, e.g. having a smaller spring constant, detector pin 40 may be less tightly wedged between housing walls 46 and 92. In this manner, the rigidity of the spring 104, e.g. its spring constant, may define the physical shock threshold that will place the shock sense indicator 40 into a shocked state. A lesser spring constant will more readily allow spring compression and resulting movement of pin 105 and sleeve 107 relative to one another in response to a shock load. Mass 56 can be provided to further promote displacement. Visual, audible, and machine-detectable shock indication are provided.

Figure 13:
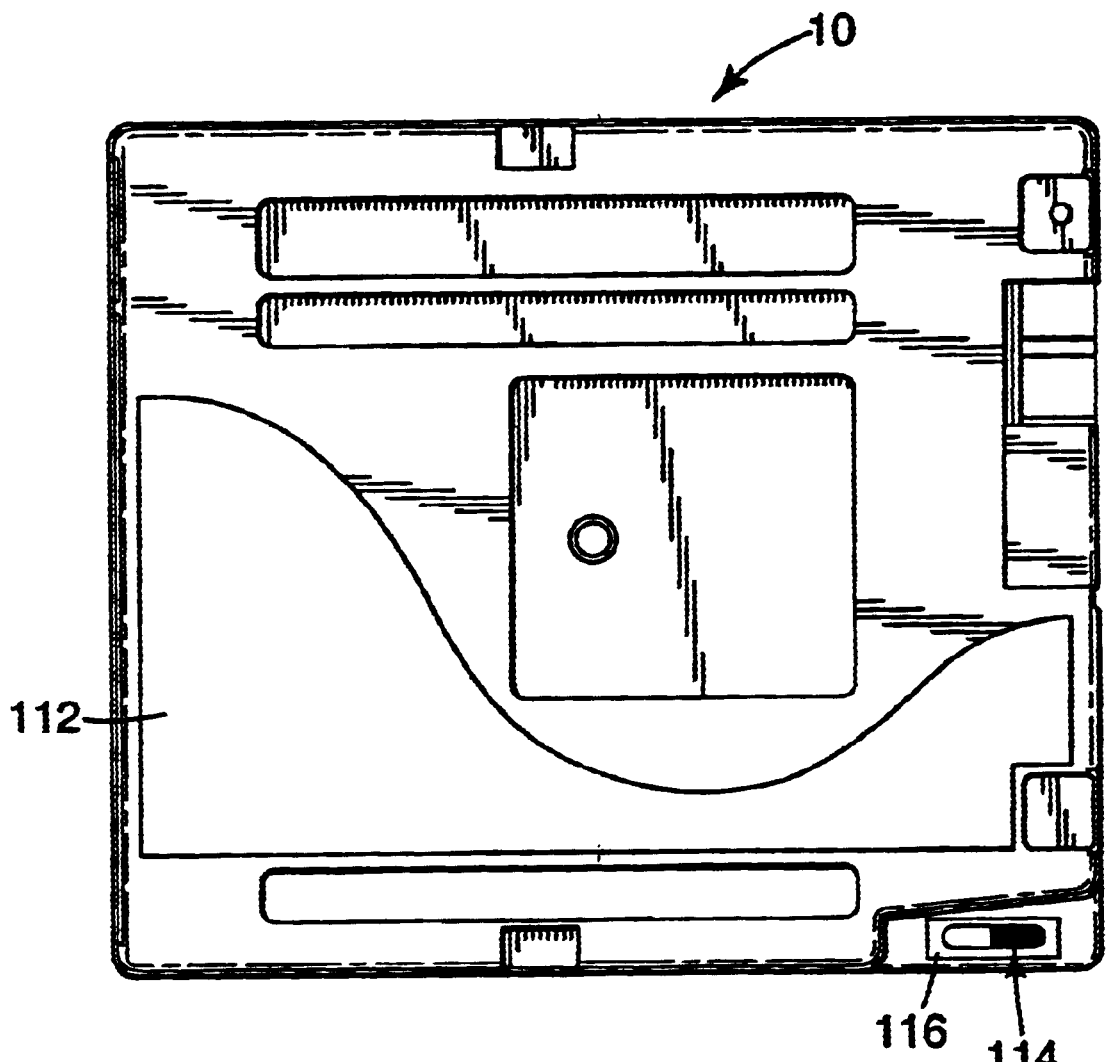
FIG. 13 is an exterior plan view of a data storage device in accordance with another embodiment of the present invention.

FIG. 13 is an exterior plan view of a data storage device 10 incorporating a shock indicator 40 in accordance with another embodiment of the present invention. As in the embodiments described with reference to FIGS. 1–12, data storage device 10 may have a data storage medium for storing data and a housing 112 that substantially encloses the data storage medium. The data storage device may have at least one visible shock sense indicator 114 disposed within the housing 112, and may further comprise an inspection window 116 disposed on the housing adjacent to the visible shock sense indicator 114. In contrast to the embodiments described with reference to FIGS. 1–12, shock sense indicator 114 may take the form of a visible indicator that visually changes its characteristics in response to a shock load without the need for moving mechanical components.

Visible shock indicator 114 may take the form of a commercially available shock detector, for example, that provides a contrast agent reservoir filled with contrast agent, an absorbing wick, and a compressible wall. An example of a suitable shock detector is described in U.S. Pat. No. 5,323,729. Application of a force to shock indicator 114 compresses the inner wall and brings the wick into contact with the reservoir, causing a visible change in the color of the wick. For example, the wick may change from white to red, from transparent to opaque, or undergo other similar optical transitions. Importantly, in accordance with an embodiment of the present invention, visible shock sense indicator 114 is mounted within housing 112 of data storage device 10 such that it is integral to the data storage device.

Mounting visible shock sense indicator 114 within housing 112 of data storage device 10 helps ensure that the visible shock detector does not fall off the device. Also, if visible shock sense indicator 114 is integral to the data storage device, no adhesive or other external bonding is needed. Additionally, during fabrication of the data storage device, visible shock sense indicator 114 may be readily oriented along a predetermined and defined axis. Moreover, if visible shock sense indicator 114 is mounted integral to the housing, a data storage drive 30 may optically detect whether the visible shock sense indicator 114 is in a shocked state, e.g., by comparing reflectivity or transmissivity characteristics of the indicator to a predetermined reference level. If indicator 114 were mounted on the exterior of housing 112, device loading in existing drives could be compromised. In addition, alignment of indicator 114 with optical detectors within the drives could be difficult. Mounting indicator 114 within housing 112 facilitates loading of device 10 into a variety of drives, as well as retrofitting or redesign of drives to incorporate suitable optical detection devices.

Inspection window 116 may take the form of an aperture defined by housing 112. Alternatively, inspection window 116 may be a transparent or translucent window that is insert-molded with housing 112 or produced by thinning a portion of the housing. Further, the entire housing or a portion thereof could be realized by a transparent material. Also, an aperture could be defined in housing 112, followed by mounting of a transparent or translucent window within the aperture to protect the interior of the data storage device form dust and debris. As a further alternative, inner walls could be formed to wall off indicator 114 from interior working portions of the data storage device, likewise limiting introduction of dust and debris.

In some embodiments, multiple shock sensors can be disposed in different locations throughout the housing. Moreover, if multiple detectors re used, they may be oriented in a manner such that each sensor is most sensitive to physical shock in a unique axis. Commercially available shock sense indicators may provide more sensitivity along different axes. Thus, the same force may cause a commercially available shock sense indicator to go into a shocked state if the force is applied along a first axis, but might not cause the shock sense indicator to go into a shocked state if the force is applied along a second axis.

Figure 14:
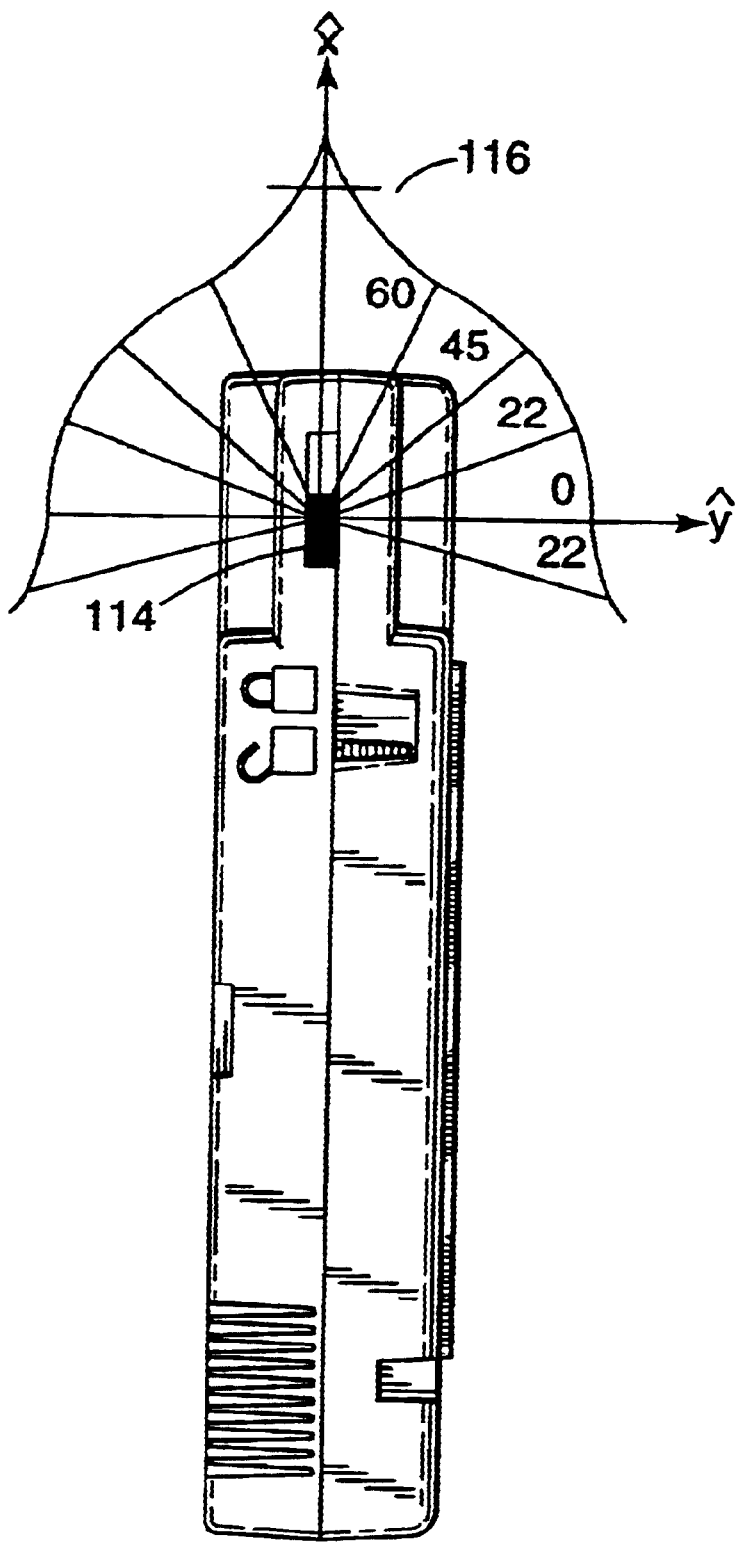
FIG. 14 is a view of one embodiment of a data storage device showing shock load vector representations along various shock axes.

FIG. 14 is a side view of one embodiment of a data storage device as shown in FIG. 13, showing vector representations of different drop axes for a shock sense indicator 114. In FIG. 14, a visible shock sense indicator 114 could be oriented according to the vector representation 116. As shown, the visible shock sense indicator 114 would be most sensitive to a physical force along the X axis. Indicator 114 could be longitudinally oriented along any of the various axes shown in FIG. 14, however, to achieve directional sensitivity, as desired.

Figure 15:
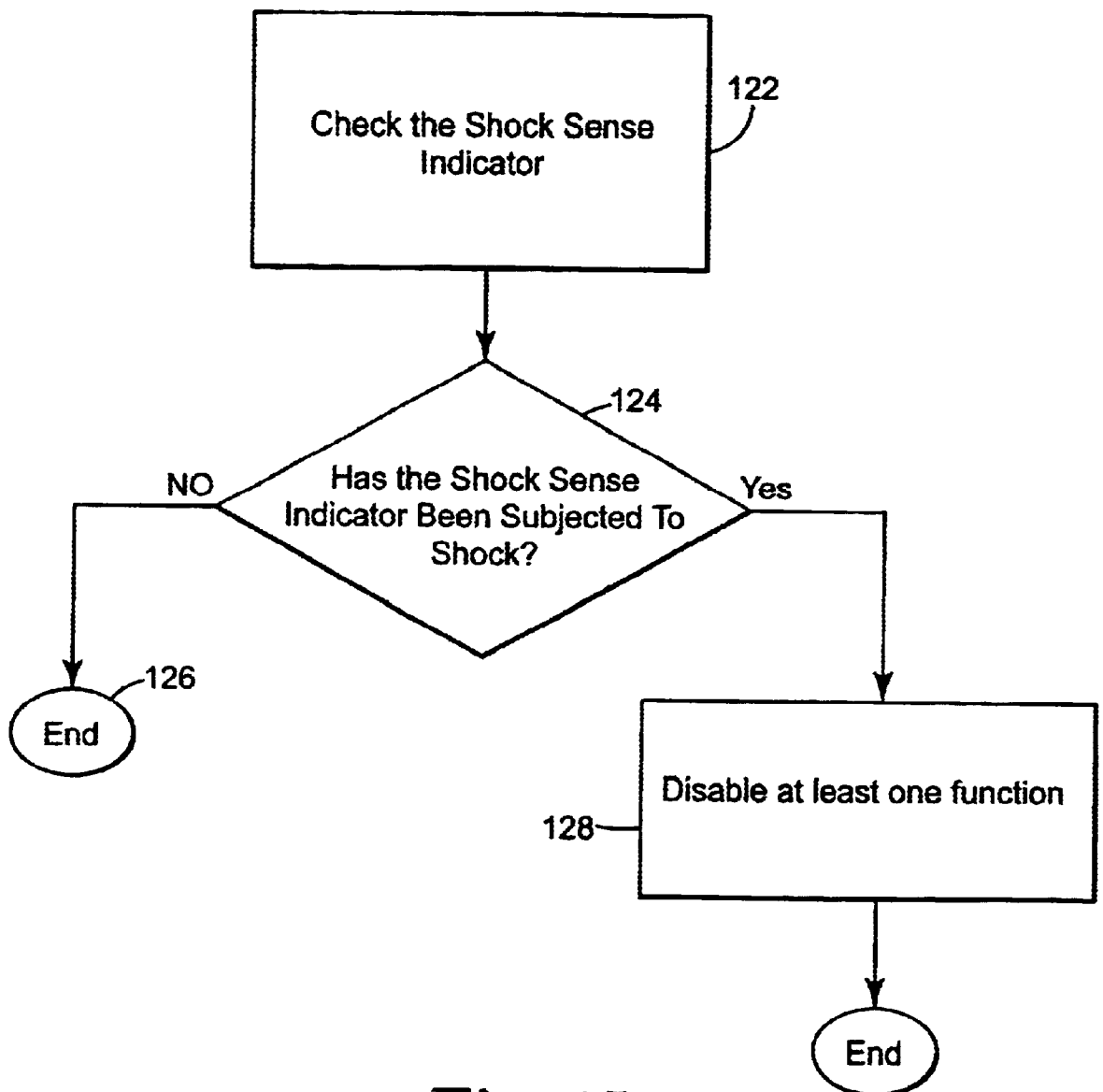
FIG. 15 is a flow diagram showing the operation of a method in accordance with an embodiment of the present invention.

FIG. 15 is a flow diagram showing the operation of a method in accordance with the present invention. In general, the method may include checking the shock sense indicator, e.g., by visually, audibly, optically or mechanically inspecting the indicator, as indicated by block 122. On the basis of that inspection, it is determined whether the shock sense indicator has been subjected to a shock load above a predetermined threshold, as indicated by block 124. If a sufficient shock load has been applied, the shock sense indicator will change state. If the shock sense indicator has not been subjected to a physical shock, then no action is taken, as indicated by block 126. However, if the shock sense indicator has been subjected to a physical shock, then at least one function of the drive into which the device is loaded will be disabled, as indicated by block 128. Again, the drive can be placed in a read-only mode, or disabled altogether so long as the device remains loaded in the drive.

The shock sense indicator can be checked, as indicated by block 122, in several different ways. As described with reference to FIGS. 2 and 3, one method of checking whether a shock sense indicator has been subjected to physical shock is to interface a data storage device having a shock sense indicator with a data storage drive having a detector switch. In this manner, the data storage drive queries whether the shock sense indicator has been subjected to physical shock. The query may be user activated after a data storage device has been inserted into a data storage drive, or automatically machine activated when the data storage device is loaded into a data storage drive. In either case, a mechanism such as a detector switch may interface with a shock sense indicator to determine whether the shock sense indicator has been subjected to physical shock.

Alternatively, the shock sense indicator could be checked by a user. For instance, a user could check the shock sense indicator manually, visually, audibly, or in any other manner. As such, a user could query whether a shock sense indicator has been subjected to shock. In one embodiment, a computer may be attached to a data storage drive such that upon detection that a shock sense indicator is in a shocked state, the data storage drive may send a visibly detectable indication to a user, e.g., via an LED or other indicator. Moreover, a data storage drive may send a signal to the computer which informs a user, via a message that may appear on a computer display screen, that the data storage device has been subjected to physical shock.

The shock sense indicator could be checked, alternatively, via optical detection. For instance, a data storage drive may have a photodetector that senses the darkness of the visual indicator. In addition, a data storage drive may have a light source that illuminates the shock sense indicator such that photodetector senses the reflection of light off of the shock sense indicator. In this manner the shock sense indicator could be checked automatically by a data storage drive without the need for mechanical interaction between a drive detector switch and the data storage device.

If the shock sense indicator has been subjected to physical shock, then some affirmative action must be taken. For instance, at least one function might be disabled, or alternatively enabled. The function might be disabled or enabled on the data storage device, e.g., by putting the device into a write protected mode. Alternatively, the function might be disabled or enabled on the data storage drive, e.g., by putting the drive into a read only mode or enabling a function that writes shock data onto the data storage drive. In this manner, the data stored on a data storage device may be protected from an accidental overwrite or other type of data loss.

Figure 16:
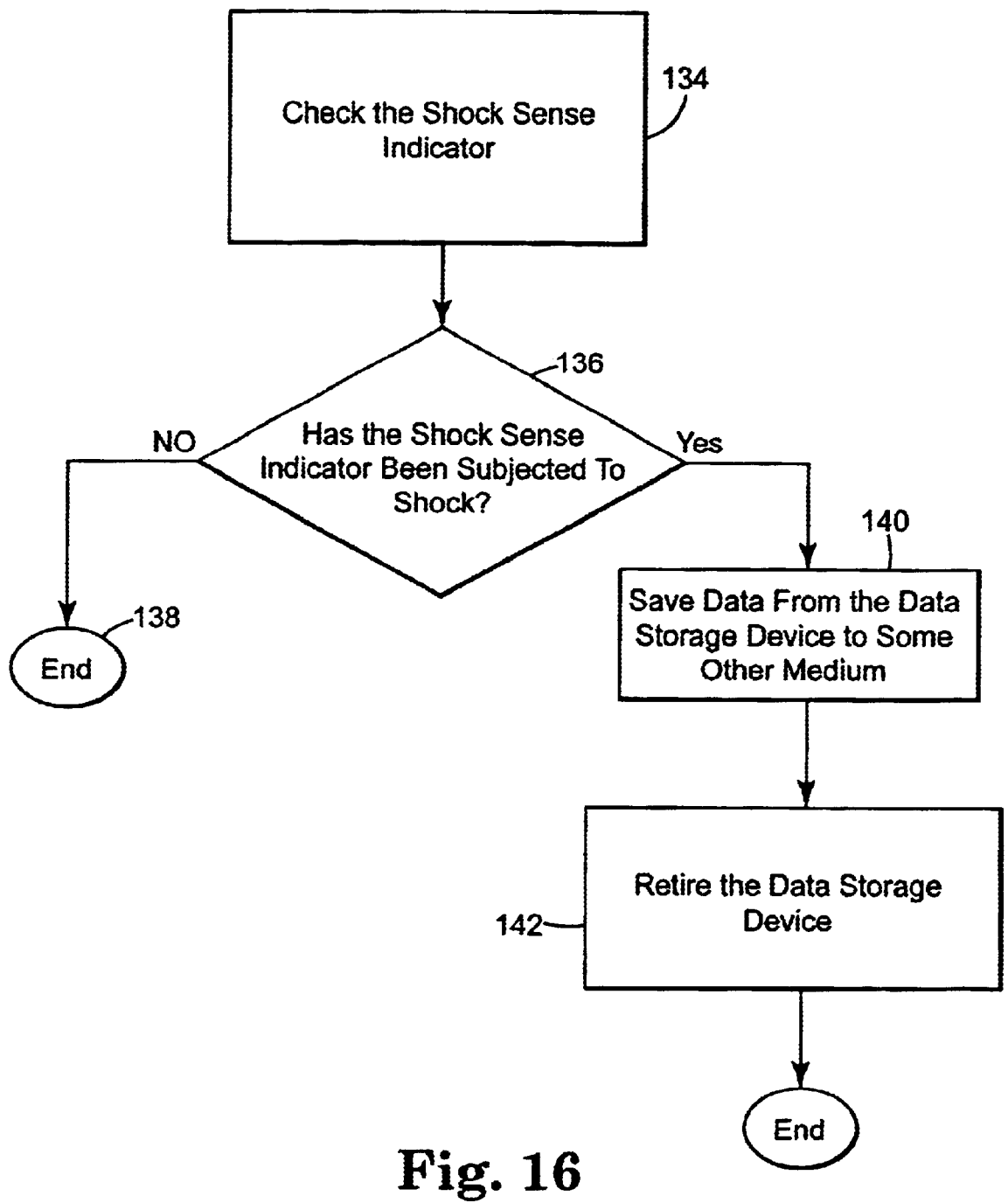
FIG. 16 is a flow diagram showing the operation of a method in accordance with another embodiment of the present invention.

FIG. 16 is a flow diagram showing the operation of a method in accordance with another embodiment of the present invention. The method includes checking the shock sense indicator, as indicated by block 134. If the shock sense indicator has not been subjected to a physical shock, as determined according to block 136, then no action is taken, as indicated by block 138. However, if the shock sense indicator has been subjected to physical shock, the data is saved from the data storage device to some other data storage medium, as indicated by block 140, and the data storage device is retired, as indicated by block 142. For example, the user can be advised to submit the device to a data recovery center or risk data loss or corruption.

In FIG. 16, steps 134, 136, and 138 are substantially equivalent to steps 120, 122 and 124 of FIG. 15. If the shock sense indicator has been subjected to physical shock, as indicated by block 136, the data stored on a data storage device may be saved to some other data storage medium, as indicated by block 140. Saving the data to another storage medium, as indicated by block 136 may require the user to act affirmatively. However, in some embodiments, a data storage drive may automatically save data from the data storage device to another storage medium upon detecting that the shock sense indicator is in a shocked state. An application running on a host computer, for example, may engage in a read operation whereby data from the device is copied to a hard drive or network server storage. Once the data has been saved to another storage medium, the data storage device may be retired, as indicated by block 142.

Figure 17:
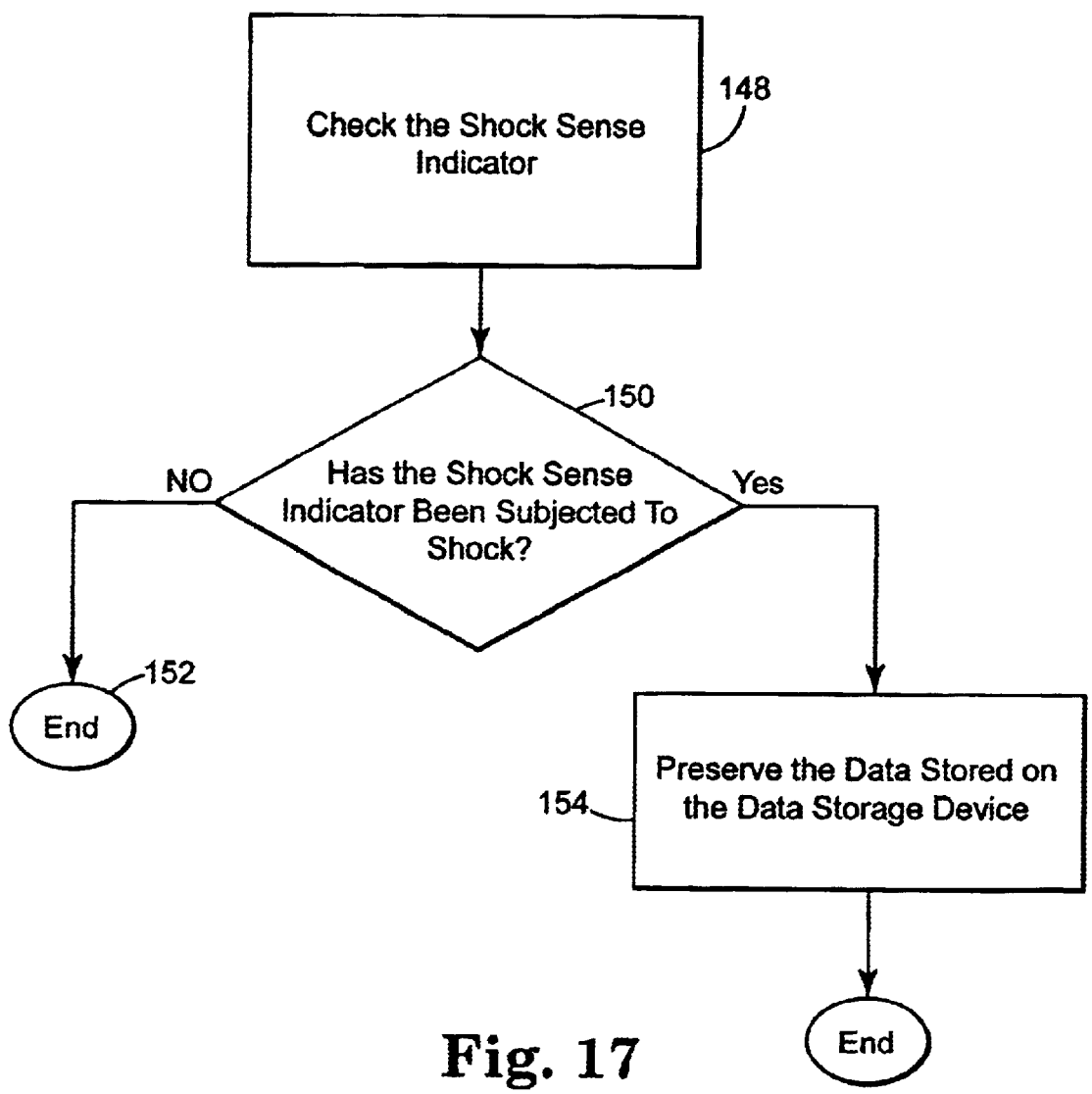
FIG. 17 is another flow diagram showing the operation of a method in accordance with a further embodiment of the present invention.

FIG. 17 is a flow diagram showing the operation of a method in accordance with another the present invention. The method includes checking the shock sense indicator, as indicated by block 148. If the shock sense indicator has not been subjected to a physical shock, as determined according to block 150, then no action is taken, as indicated by block 152. However, if the shock sense indicator has been subjected to physical shock, then the data contained on the data storage device is preserved, as indicated by block 154. Preservation may refer to copying the data to another medium, or simply disabling further read/write operations to minimize the likelihood of further data loss or corruption.

A number of embodiments of the present invention have been described. Nevertheless, it will be understood that various modifications may be made without departing from the spirit and scope of the invention as defined in the following claims.

What is claimed is:

1. A removable data storage cartridge comprising:
   a data storage medium;
   a housing that substantially encloses at least a portion of the data storage medium, wherein the housing defines an aperture; and
   a shock sense indicator disposed within said housing, wherein the shock sense indicator is disposed in a first position within the housing in substantial alignment with the aperture, wherein physical shock in excess of a threshold causes the shock sense indicator to physically displace from its first position such that the shock sense indicator is not in substantial alignment with the aperture.

2. A data storage cartridge as in claim 1, wherein the data storage medium is selected from the group consisting of magnetic tape, magnetic disk, optical tape, and optical disk.

3. A data storage cartridge as in claim 1, wherein the housing defines an aperture and the shock sense indicator is disposed adjacent to the aperture.

4. A data storage cartridge as in claim 1, wherein the shock sense indicator is a detector pin.

5. A data storage cartridge as in claim 4, wherein displacement of the detector pin from its first position is visible through the aperture.

6. A data storage cartridge as in claim 4, further comprising a baseplate, the pin being mounted to the baseplate.

7. A data storage cartridge as in claim 1, wherein physical shock over a threshold places the shock sense indicator into a shocked state.

8. A data storage cartridge as in claim 7, wherein the shocked state is detectable by a data storage drive.

9. A data storage cartridge as in claim 8, wherein the data storage drive can sense whether the data storage cartridge is in a shocked state via a drive detector switch that mates with the aperture.

10. A data storage cartridge as in claim 9, wherein the aperture is configured to permit the drive detector switch to protrude through the aperture into a recess of a detector pin when the data storage cartridge is in an unshocked state.

11. A data storage cartridge as in claim 9, wherein the drive detector switch is able to protrude through the aperture when the data storage cartridge is in a shocked state.

12. A data storage device as in claim 1, wherein the shock sense indicator visibly indicates whether the data storage cartridge has been subjected to a physical shock.

13. A data storage device comprising:
   a data storage medium;
   a housing that substantially encloses at least a portion of the data storage medium; and
   a shock sense indicator disposed within said housing, wherein the shock sense indicator includes a detector pin disposed in a first position within the housing, wherein physical shock in excess of a threshold causes the detector pin to displace from its first position,
   the data storage device further comprising a baseplate, the detector pin being mounted to the baseplate, wherein the baseplate defines a thinned segment, the detector pin being attached to the baseplate at the thinned segment, and wherein the baseplate defines at least one slit and the detector pin is attached adjacent to the slit.

14. A data storage device as in claim 13, wherein the slit defines a springboard on the baseplate and the detector pin is attached to the springboard.

15. A data storage drive for manipulating data stored on a removable data storage device, the data storage drive comprising a mechanism that interfaces with an aperture of the removable data storage device to determine whether a shock sense indicator disposed within a housing of the removable data storage device is in substantial alignment with the aperture, wherein the data storage drive determines that the removable data storage device has been subjected to physical shock over a threshold by determining that shock sense indicator is not in substantial alignment with the aperture.

16. A data storage drive as in claim 15, further comprising a controller, wherein at least one operation of the data storage drive is disabled by the controller if the mechanism determines that the data storage device has been subjected to physical shock.

17. A data storage drive as in claim 15, further comprising a controller wherein least one operation of the data storage drive is enabled if the mechanism determines that the data storage device has been subjected to physical shock.

18. A data storage drive as in claim 15, further comprising a controller, wherein the controller inhibits the data storage drive from performing read/write operations on the data storage device if the mechanism determines that the data storage device has been subjected to physical shock.

19. The data storage drive as in claim 15, further comprising a controller, wherein the controller activates a read only mode in the data storage drive if the mechanism determines that the data storage device has been subjected to physical shock.

20. A data storage drive as in claim 15, further comprising a controller, wherein the controller stores shock sense data indicative of physical shock on the data storage device if the mechanism determines that the data storage device has been subjected to physical shock.

21. A data storage drive as in claim 20, wherein the controller further detects whether shock sense data has been stored on the data storage device, and wherein the data storage drive is unable to perform write operations on the data storage device upon detecting that sense data has been stored on the data storage device.

22. A data storage drive as in claim 20, wherein the sense data includes the date and time that the data storage drive stored sense data on the data storage device.

23. A data storage system comprising:
   a removable data storage device comprising:
      a data storage medium,
      a housing that substantially encloses at least a portion of the data storage medium, wherein the housing defines an aperture, and
      a shock sense indicator disposed within the housing wherein the shock sense indicator is disposed in a first position within the housing in substantial alignment with the aperture, wherein physical shock in excess of a threshold causes the shock sense indicator to physically displace from its first position such that the shock sense indicator is not in substantial alignment with the aperture; and
   a data storage drive for manipulating data stored on the removable data storage device, the data storage drive comprising a mechanism that interfaces with the aperture to determine whether the shock sense indicator has displaced from it first position to indicate that the removable data storage device has been subjected to physical shock over a threshold.

24. A removable data storage cartridge comprising:
   a data storage medium;
   a housing that substantially encloses at least a portion of the data storage medium, wherein the housing defines a window; and
   a shock sense indicator disposed within said housing, wherein the shock sense indicator is disposed in a first position within the housing in substantial alignment with the window, wherein physical shock in excess of a threshold causes the shock sense indicator to physically displace from its first position such that the shock sense indicator is not in substantial alignment with the window.

25. A data storage system comprising:
a removable data storage device comprising:
  a data storage medium,
  a housing that substantially encloses at least a portion of the data storage medium, wherein the housing defines a window, and
  a shock sense indicator disposed within the housing, wherein the shock sense indicator is disposed in a first position within the housing in substantial alignment with the window, wherein physical shock in excess of a threshold causes the shock sense indicator to physically displace from its first position such that the shock sense indicator is not in substantial alignment with the window; and
a data storage drive for manipulating data stored on the removable data storage device, the data storage drive comprising a mechanism that interfaces with the data storage device to determine whether the shock sense indicator has displaced from it first position to indicate that the removable data storage device has been subjected to physical shock over a threshold.

* * * * *